United States Patent
Howson

(10) Patent No.: US 11,861,792 B2
(45) Date of Patent: *Jan. 2, 2024

(54) TESSELLATION OF PATCHES OF SURFACES IN A TILE BASED RENDERING SYSTEM

(71) Applicant: Imagination Technologies Limited, Kings Langley (GB)

(72) Inventor: John William Howson, St. Albans (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 18/122,962

(22) Filed: Mar. 17, 2023

(65) Prior Publication Data

US 2023/0230323 A1    Jul. 20, 2023

Related U.S. Application Data

(63) Continuation of application No. 15/728,716, filed on Oct. 10, 2017, now Pat. No. 11,610,368, which is a continuation of application No. 13/066,957, filed on Apr. 28, 2011, now Pat. No. 9,818,222.

(30) Foreign Application Priority Data

Apr. 30, 2010 (GB) .................................. 1007348

(51) Int. Cl.
     G06T 17/20    (2006.01)
     G06T 15/00    (2011.01)
     G06T 15/40    (2011.01)

(52) U.S. Cl.
     CPC ............ G06T 17/20 (2013.01); G06T 15/005 (2013.01); G06T 15/40 (2013.01)

(58) Field of Classification Search
None
See application file for complete search history.

(56) References Cited

U.S. PATENT DOCUMENTS

| | | | |
|---|---|---|---|
| 5,864,342 A | 1/1999 | Kajiya et al. | |
| 7,324,115 B2 | 1/2008 | Fraser | |
| 7,468,726 B1 | 12/2008 | Wloka et al. | |
| 2005/0195188 A1 | 9/2005 | Goel et al. | |

FOREIGN PATENT DOCUMENTS

WO    2009/093956 A1    7/2009

OTHER PUBLICATIONS

Cook et al., "The Reyes Image Rendering Architecture," ACM Computer Graphics, vol. 21, No. 4, pp. 95-102, Jul. 1987.

(Continued)

*Primary Examiner* — Robert Bader
(74) *Attorney, Agent, or Firm* — Potomac Law Group, PLLC; Vincent M DeLuca

(57) ABSTRACT

A method and apparatus are provided for tessellating patches of surfaces in a tile based three dimensional computer graphics rendering system. For each tile in an image a per tile list of primitive indices is derived for tessellated primitives which make up a patch. Hidden surface removal is then performed on the patch and any domain points which remain after hidden surface removal are derived. The primitives are then shaded for display.

20 Claims, 7 Drawing Sheets

(56) References Cited

OTHER PUBLICATIONS

Eisenacher et al., "Real-Time View-Dependent Rendering of Parametric Surfaces," ACM, Proceedings of the 2009 Symposium on Interactive 3D Graphics and Games, pp. 137-143, Mar. 2009.
Patney et al., "Real-Time Reyes-Style Adaptive Surface Subdivision," ACM Transactions on Graphics, vol. 27, No. 5, Article 143, Dec. 2008.
Chung et al., "Shader-Based Tessellation to Save Memory Bandwidth in a Mobile Multimedia Processor," Computers & Graphics, vol. 33, pp. 625-637, Oct. 2009.
Hasselgren et al., "Automatic Pre-Tessellation Culling," ACM Transactions on Graphics, vol. 28, No. 2, pp. 1-10, Apr. 2009.
Loop et al., "Real-Time Patch-Based Sort-Middle Rendering on Massively Parallel Hardware," Microsoft Research Technical Report MSR-TR-2009-83, pp. 1-19, May 2009.
Zhou et al., "RenderAnts: Interactive Reyes Rendering on GPUs," ACM Transactions on Graphics, vol. 28, No. 5, Article 155, Dec. 2009.
Seiler et al., "Larabee: A Many-Core x86 Architecture for Visual Computing," ACM Transactions on Graphics, vol. 27, No. 3, Article 18, Aug. 2008.
Tatarchuk et al., "Programming for Real-Time Tessellation on GPU," AMD, Inc., 2009.
Kumar et al., "Hierarchical Back-Face Culling," 7th Eurographics Workshop on Rendering, pp. 231-240, Apr. 1996.

TESSELLATION OF PATCHES OF SURFACES IN A TILE BASED RENDERING SYSTEM

This invention relates to a three-dimensional computer graphics rendering system in particular to methods and apparatus for tessellating patches of surfaces in a tile based rendering system.

BACKGROUND TO THE INVENTION

High order surfaces are a well known technique within the computer graphics industry. Higher order surfaces or "patches" which are functions of polynomial equations typically define a set of control points that are used to describe the behaviour of a curved surface in terms of well known mathematical parametric relationships between a variable 't' (for a curve that is plotted in two dimension) or two variables u, v (for a curve that is plotted in three dimensions) and the surface of a curve. FIG. 1 illustrates a Bezier patch which is a well known example of a high order surface type used within 3D computer graphics. A point P 100, on the Bezier surface 110 is defined by the function of the parametric coordinates u, v 120 (also known as the domain co-ordinates) and the corresponding control points $k_{i,j}$ 130, $$P(u, v) = \sum_{i=0}^{n} \sum_{j=0}^{m} A u^i (1-u)^{n-i} B v^j (1-v)^{m-j} k_{i,j}$$

Where A and B are constants defined as, $$A = \frac{n!}{i!(n-i)!} \text{ and } B = \frac{m!}{j!(m-j)!}$$

It should be noted that values of P(u,v) lie within the hull 140 represented by the control points $k_{i,j}$ 130. It should also be noted that this is only an example of one possible surface formulation and that there are many other possibilities.

Tessellation is a well known technique that subdivides a surface into a number of smaller adjoined surfaces lying on the plane of and within the boundaries of the original surface. FIG. 2 illustrates tessellation of the domain points for a Bezier patch using binary sub-division. The un-tessellated domain 200 with 16 domain points and 0.25 intervals on each axis represents the minimum number of points within a tessellated patch, this being the same as the number of points within a Bezier surface. One level of tessellation is applied at 210 resulting in a further set of domain points being generated at intervals that lie at the mid points between each adjacent pair of points of the original set of points. A second level of tessellation 220 introduces a further set midpoints between these points generated at 210. This process is repeated until a suitable desired level of tessellation is achieved, this being determined by the application. It should be noted that this approach represents one possible method from many and is presented here only as an example.

Microsoft's Dx11 application programming interface (API) introduces a programmable approach for implementing patches within a graphics hardware pipeline. FIG. 3 illustrates the pipeline required by the Dx11 API. A vertex shader stage 300 takes a set of individual control points for a patch and applies an arbitrary mathematical transform to these using programmable hardware in a manner well known to those skilled in the art. The transformed control points are then passed to a hull shader 310 which calculates tessellation factors for the edges of the patch and applies further application defined modifications to the transformed control points.

The edge tessellation factors for the patch are passed to a tessellation unit 320. The tessellation unit is split into two parts, domain tessellation and connectivity tessellation. Domain tessellation subdivides a patch into a number of points known as "domain" points based on the supplied tessellation factors in a similar manner to that described for FIG. 2 but using a specific approach as prescribed by the Dx11 API. Connectivity tessellation determines how the resulting "Domain" points are combined or connected to produces tessellated primitives. As with domain tessellation the method for implementing this is defined by Microsoft's Dx11 and will be familiar to those skilled in the art.

The tessellated domain points are passed to a domain shader 330 which combines them with the control points produced by the hull shader in a programmable manner.

Typically the domain shader will apply a well known curved surface formulation such as a Bezier patch as described above with respect to FIG. 1. The resulting values may then be further modified using well known techniques such as displacement mapping. Displacement mapping is a technique in which the results of a high order surface tessellation are displaced by a height that is sampled from a texture map. Displacement mapping typically means that the points on a curved surface no longer reside within a readily definable "hull".

Tile based rendering systems are well-known. These subdivide an image into a plurality of rectangular blocks or tiles. One way in which this is done and the subsequent texturing and the shading performed is shown schematically in FIG. 4. These techniques are well known.

Tile based rendering is generally split into two phases, the first of which is known as the geometry processing phase which performs the following operations.

Firstly, a primitive/command fetch unit 400 retrieves command and primitive data from a memory and passes this to a geometry shader 405. A clip/cull unit 410 and a projection unit 415 may be interposed between geometry shader 405 and tiling unit 420 The primitive and command data may be transformed into screen space using well-known methods.

This data is then supplied to tiling unit 420 which inserts object data from the screen space geometry into object lists 425 for each of a set of defined rectangular regions or tiles. A tile object list for each tile contains primitives that exist wholly or partially in that tile. A tile object list exists for every tile on the screen, although some object lists may have no data in them.

The second phase of tile based rendering is generally called the rasterisation phase which performs the following operations.

The object lists are fetched by a tile parameter fetch unit 430 which supplies them tile by tile to a hidden surface removal unit (HSR) 435 which removes surfaces which will not contribute to the final scene (usually because they are obscured by another surface). The HSR unit 435 processes each primitive in the tile and passes only data for visible pixels to a shading unit 445.

The shading unit 445 takes the data from the HSR 435 and uses it to fetch textures using the texture unit 440 and applies shading to each pixel within a visible object using well-known techniques. The shading unit 445 then feeds the textured and shaded data to an on chip tile buffer 450. As operations are applied to an on chip tile buffer external memory bandwidth associated with this is eliminated.

Once each tile has been completed, the resulting data is written to an external scene buffer 455.

The addition of a Dx11 programmable tessellation pipeline to a tile based rendering system means that it is not possible to tile patch data without first fully tessellating and applying displacement mapping of the type discussed above. This results in a significant growth in the memory and bandwidth requirements associated with the tiled screen space parameter lists 425.

SUMMARY OF THE INVENTION

Preferred embodiments of the present invention provide a method and apparatus that allow a tile based rendering system to support programmable tessellation/high order surfaces and displacement mapping without the memory and bandwidth cost associated with expanding the patch data into the tiled screen space parameter buffer. This is achieved by splitting the tessellation process into three phases, Position tessellation and tiling
Position tessellation and hidden surface removal
Position and attribute tessellation and shading The first phase occurs within the geometry processing phase of a tile based rendering system and produces a tiled screen space geometry list with references to primitives that make up patches which overlap each tile. No expanded geometry is written into the parameter buffer at this stage. This is done by performing vertex shading and hull shading for the patch in full and writing the output data of the hull shader to the screen space parameter buffer. The domain tessellation part of the tessellation unit then produces all the domain points that make up the patch and the connectivity tessellation part produces indexed lists for the primitives that make up the patch. The domain shader 330 executes only the position part of the domain shader of FIG. 3 to produce the position data for the primitives which is then used along with the indexed lists to tile the tessellated primitives. The result of this phase is a per tile list of primitive indices for the tessellated primitives and the results of the hull shader being written to a parameter buffer once. It should be noted that the tessellated primitive index list may be compressed.

Both the second and third phases occur during the rasterisation phase of tile based rendering.

The second phase performs hidden surface removal on the patch data. This is performed by re-calculating the domain points and executing the position only part of the domain shader for the tessellated primitives that lie within each tile. This produces a list of primitives that are visible.

The third phase re-calculates the domain points for the primitives that remain after hidden surface removal. The domain shader is then applied to these points in full i.e. vertex attributes are also calculated. The resulting primitives are then passed down the pipeline as normal. As the third phase is executed after hidden surface removal, the amount the of work required to process the remaining primitives to their full extent is less than if they had been processed fully in either of the previous two phases.

In one embodiment the first and second phases can be combined into a single phase possibly with some loss of efficiency.

BRIEF DESCRIPTION OF THE DRAWINGS

Preferred embodiments of the invention will now be described in detail by way of example with reference to the accompanying drawings in which.

DETAILED DESCRIPTION OF PREFERRED EMBODIMENTS

Figure 5:
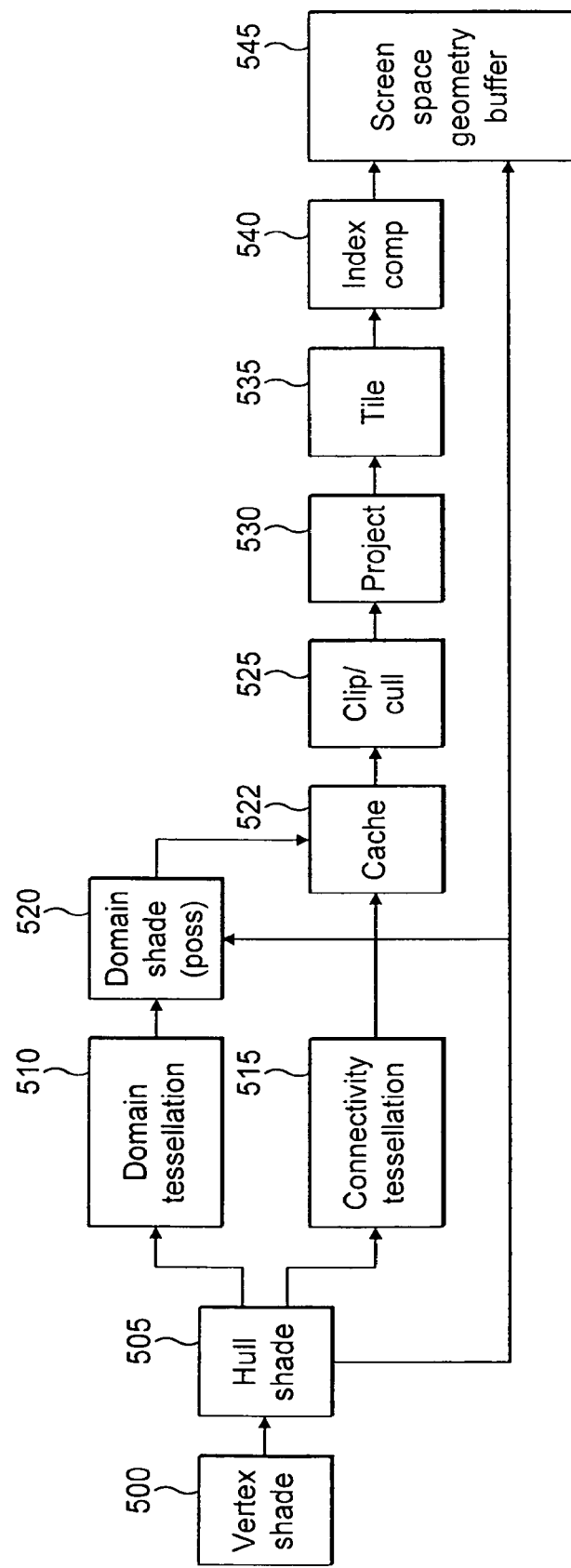
FIG. 5—illustrates the tiling phase in an embodiment of the invention
FIG. 6—illustrates the hidden surface removal phase of an embodiment of the invention.

FIG. 5 illustrates the tiling phase of a proposed system for processing programmable tessellation primitives within a tile based rendering system embodying the invention. A vertex shading unit 500 and a hull shading unit 505 operate as described above for Dx11. The hull shading unit passes calculated edge tessellation factors to both a Domain Tessellation unit 510 and a connectivity tessellation unit 515. The hull shader also passes processed control point data to a domain shader 520.

The connectivity tessellation unit 515 calculates vertex indices for triangles. These indices reference the vertices generated by the action of the domain shader on the generated domain points from the domain tessellation unit. The vertex indices are passed to a cache unit 522 which caches vertex values previously generated by the domain shading unit. It should be noted that the cache is not required but the interconnected nature of the primitives that make up the tessellated patch mean that the presence of a cache can significantly reduce the number of vertices which are processed through the domain shading unit. Where a vertex is not present within the cache it may be requested from the domain shading unit.

The domain shading unit processes only the position part of the vertex data. This is the only part that is required to tile tessellated geometry. The cache unit 522 passes on the vertices that make up the primitives to a clipping and culling unit 525 which removes any back facing, off screen or sub pixel primitives (i.e. non visible primitives). Any remaining primitives are passed to a projection unit 530 that transforms the primitives/vertices into screen space so that they can be tiled by a tiling unit 535. The tiling unit determines which primitives reside in each tile and passes a list of tile indices to an index compression unit 540. The index compression unit compresses the index stream using a well known method. The compressed indices are written to per tile geometry lists 545 along with a reference to the hull shading unit 505 output which is also written. It should also be noted that the primitive indices need not be compressed but this is a preferred feature. This process is repeated for all patches within a scene.

It should be noted that a scene does not need to be comprised wholly of patch based primitives and that conventional triangle, line or point based geometry may also be included within the scene, these primitives being processed as in a normal tile based rendering system.

It should also be noted that although the above described method stores connectivity information for the generated primitives for the tiled geometry lists it is also possible to store only a list of unique vertices without connectivity information. This information can then be used to regenerate the connectivity information in subsequent passes.

Figure 1:
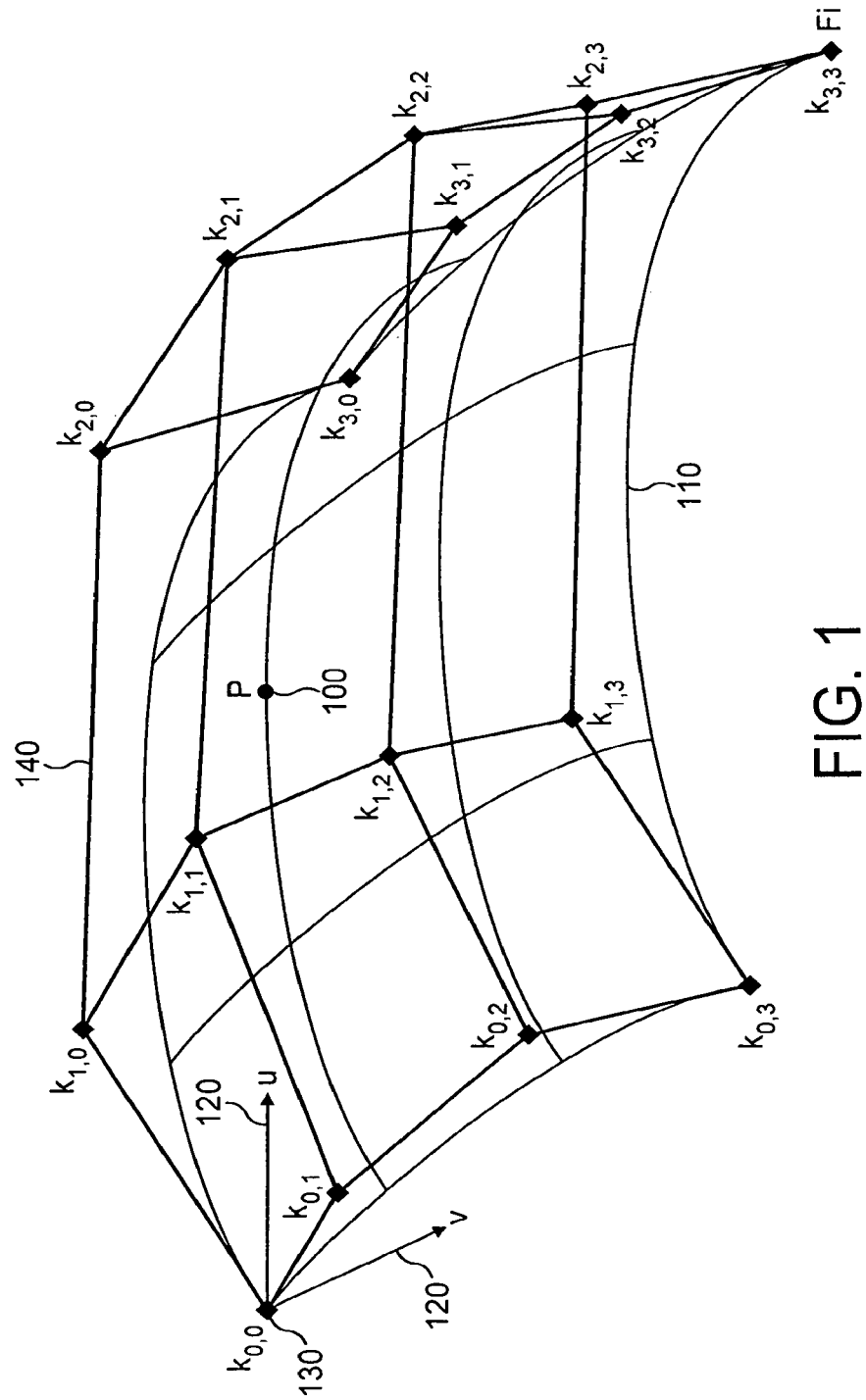
FIG. 1 illustrates a Bezier patch.
Figure 2:
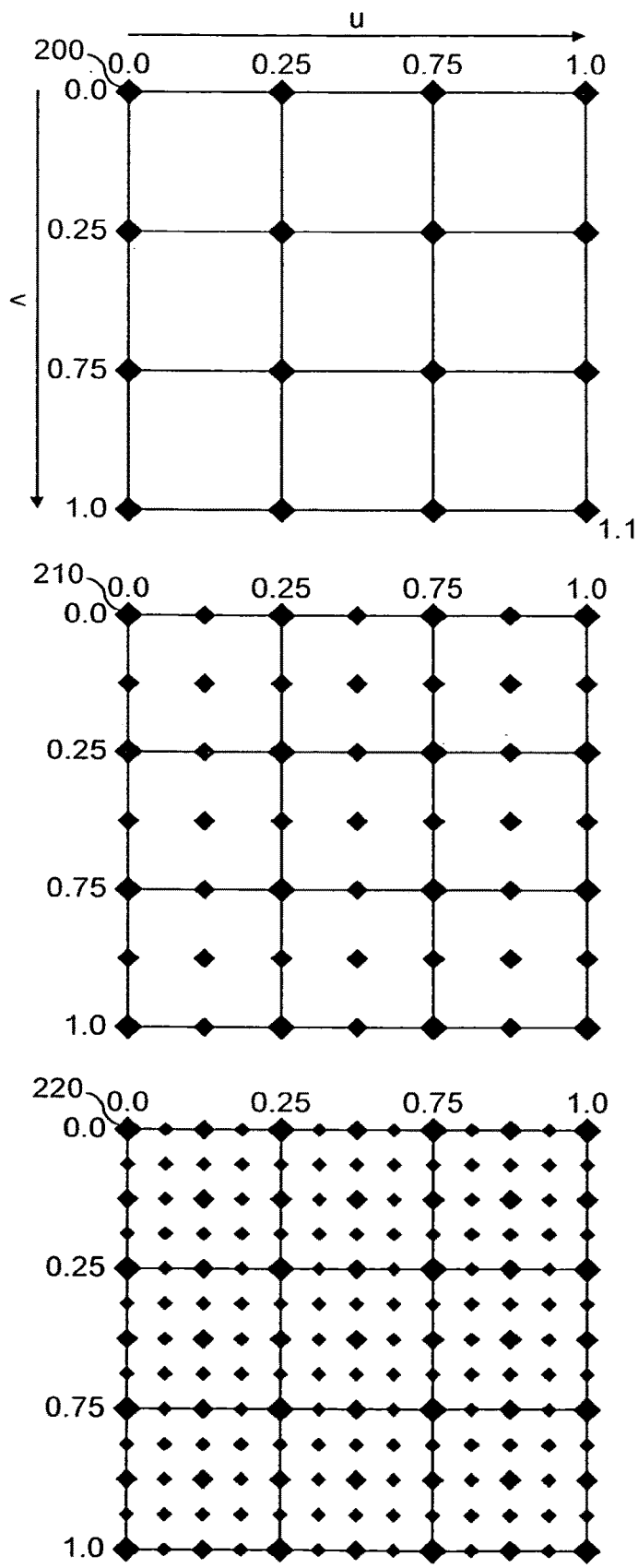
FIG. 2 illustrates the process of tessellation.
Figure 3:
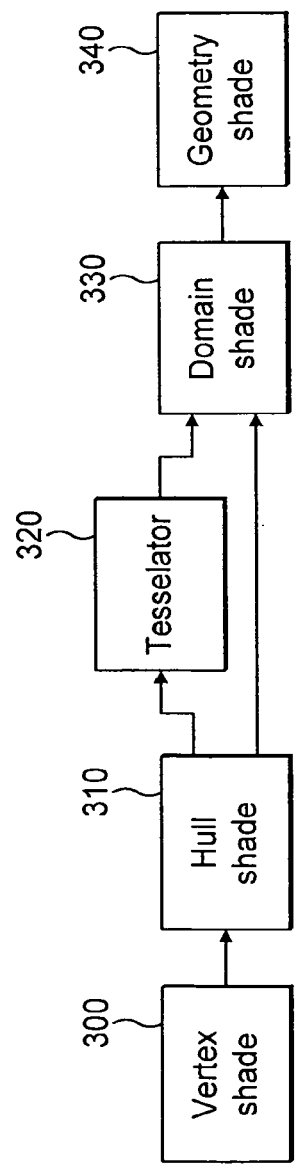
FIG. 3 illustrates a Dx11 programmable tessellation pipeline.
Figure 4:
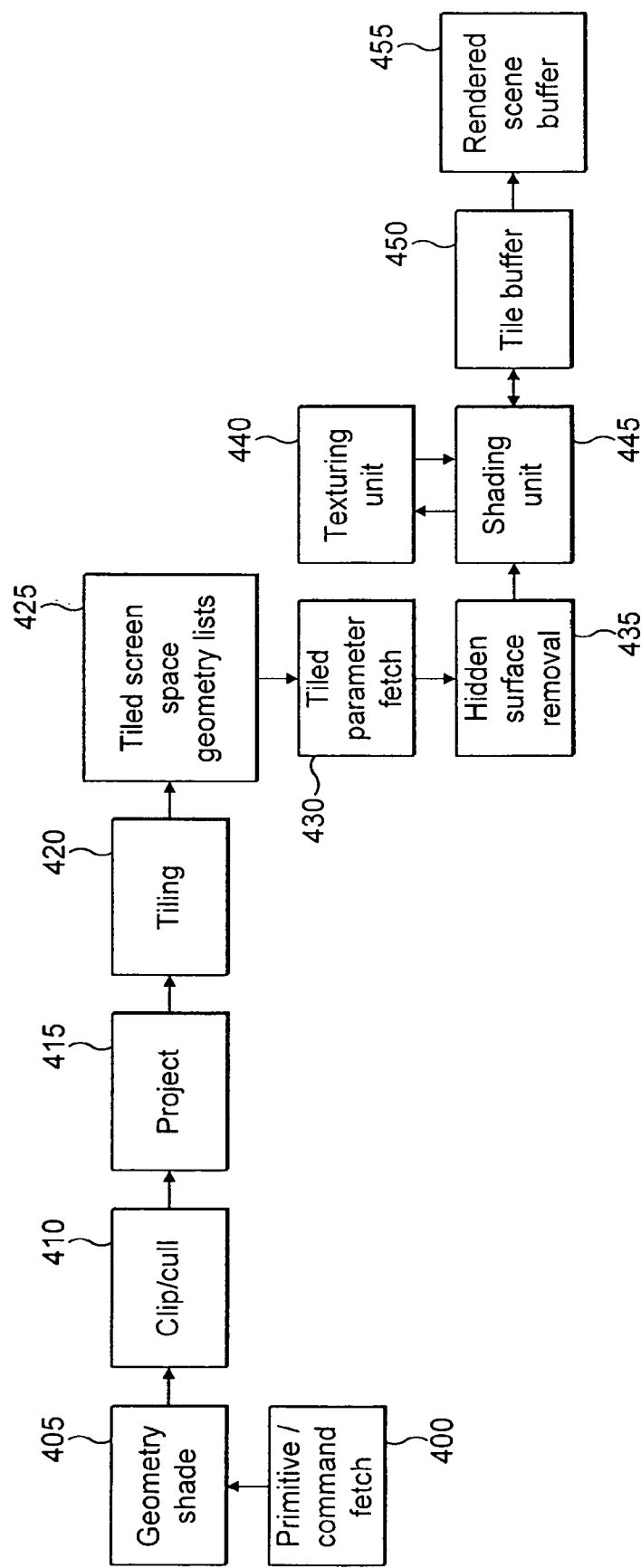
FIG. 4 shows a schematic diagram of a known tile based rendering system as discussed above.
Figure 6:
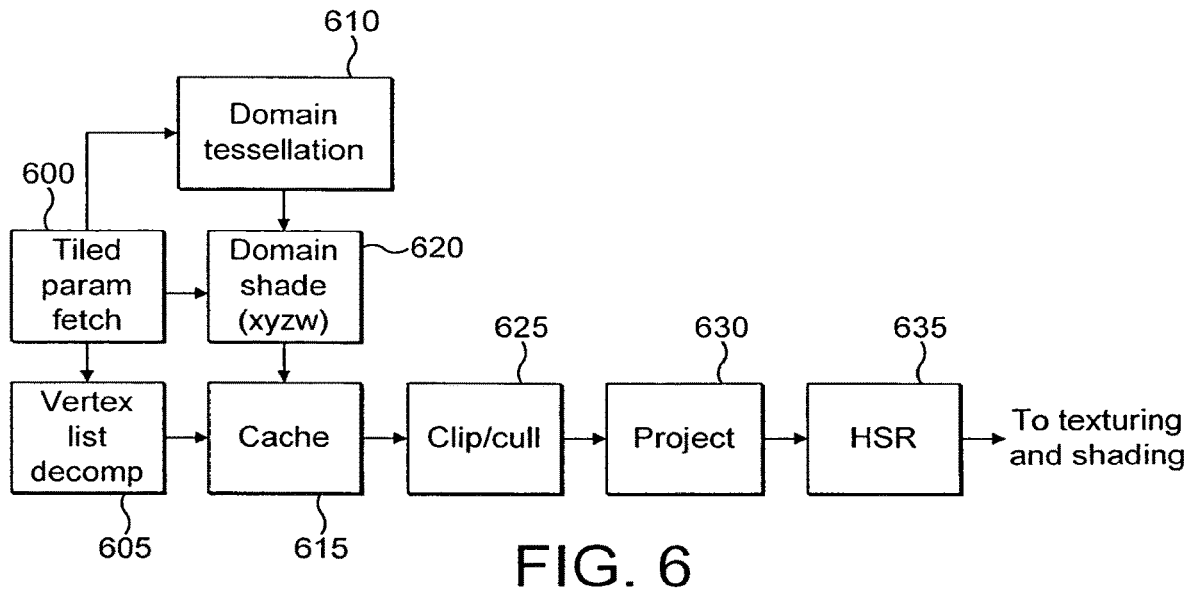

FIG. 6 illustrates the hidden surface removal phase of the rasterisation processes for patch based geometry which is performed after FIG. 4. A tile parameter fetch unit 600 fetches the hull shader generated data and a compressed list of indices for each tile from a geometry buffer 545 (FIG. 5). The edge tessellation factor component of this hull shader generated data is passed to a domain tessellation unit 610 and the control point data is passed to a domain shading unit 620. It should be noted that only the position part of the hull shader control point data is fetched by the tiled parameter fetch unit. The compressed list of indices for the primitives generated by the patch that lie within the current tile are passed to an decompression unit 605 which decompresses the indices before passing them to a cache unit 615.

The cache unit 615 contains data for vertices previously generated by the domain shading unit 620 so that vertices that are referenced multiple times need only be generated once. When the cache unit is missing data for a required vertex it requests it from the domain shader 620 which requests data from the domain tessellation unit for the underlying domain point data before generating a corresponding vertex position. It should be noted that in the tiling phase the domain shader continues to generate only the position component of the vertices. The cache unit 615 passes the vertices for the primitive to the clipping and culling unit 625 where any clipping is performed again for the primitives. The vertices generated by the clipping and culling unit are then passed to a projection unit 630 which transforms then into screen space. The screen space vertices/primitives are then passed to a hidden surface removal unit 635 that operates in the same way as is a normal tile based rendering system. The hidden surface removal unit then passes a list of visible primitive indices and patch references to the next phase of operation.

Figure 7:
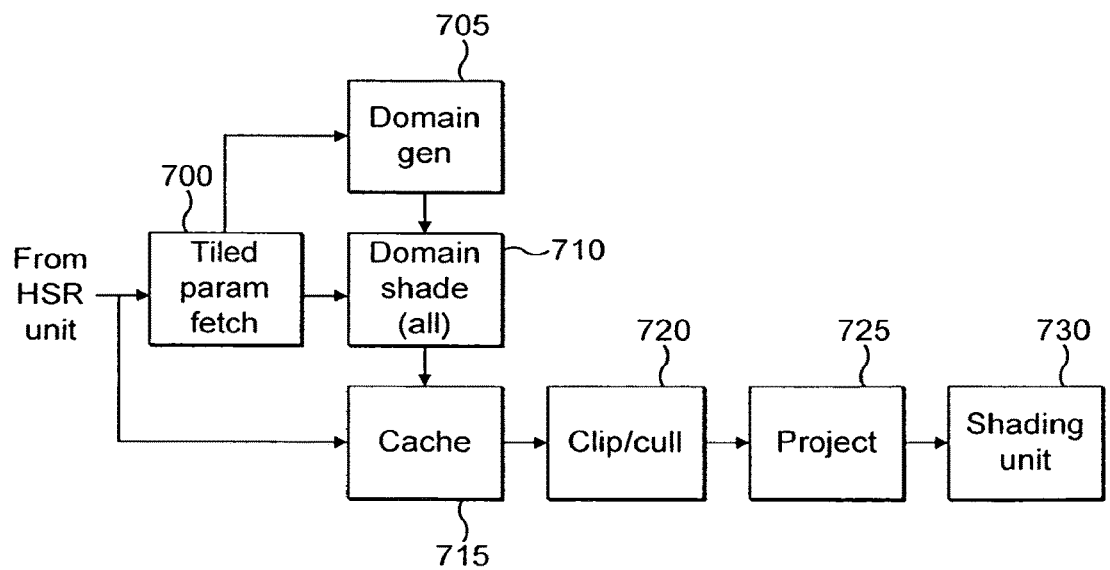
FIG. 7—illustrates the attribute phase in an embodiment of the invention; and,
FIG. 8—illustrates a tile based rendering system modified to support an embodiment of the invention.

FIG. 7 illustrates the attribute phase of the rasterisation process for patch based data. A tile based parameter fetch unit 700 receives references to patch data and lists of indices for the visible primitives from the patch within a current tile. The tile based parameter fetch unit fetches the hull shader data referenced by the patch and passes the edge tessellation factors to a domain tessellation unit 705 and the control point data to a domain shading unit 710. It should be noted that in this phase the parameter fetch unit 700 retrieves all data associated with the control points and passes it to the domain shading unit 715. The index data for the primitive vertices is passed to a cache unit 715 which, as in previous phases, contains data for vertices previously generated by the domain shader. Where a vertex isn't present the cache unit requests that the domain shader unit generates it. In this phase the domain shading unit executes the code required to generate all vertex components. The cache unit then passes the primitive vertices to clipping, culling and projection units 720 and 725 as in previous phases before they are passed to a shading unit 730 where they are processed as in a the normal tile based rendering process.

Figure 8:
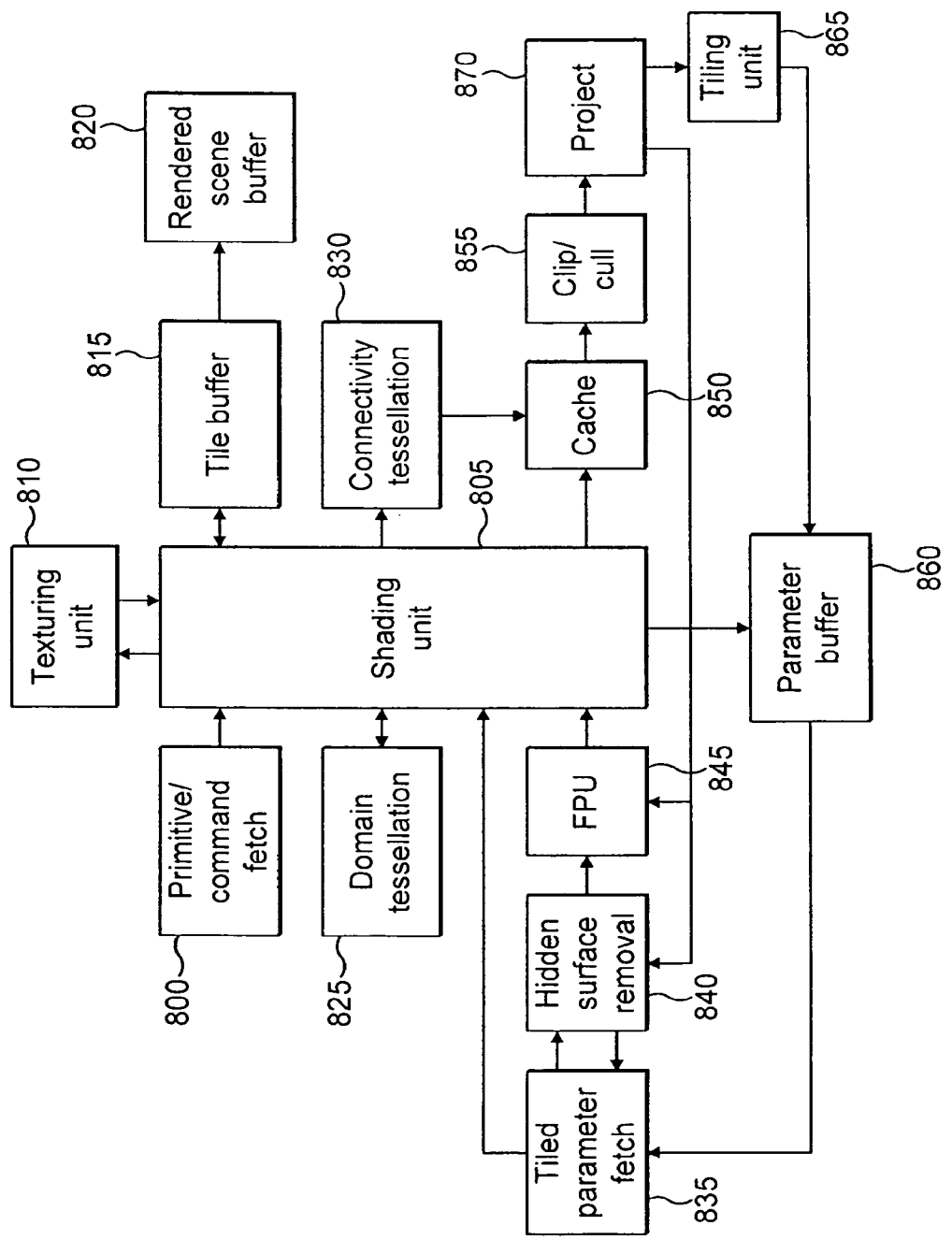

FIG. 8 illustrates a tile based rendering system that has been modified to support tessellation using the three phase process described above. A primitive/command fetch unit 800 first fetches primitives and state information from the application and provides them to a shading unit 805. The shading unit performs vertex shading and hull shading as described for phase 1, fetching textures from texturing unit 810. The shading unit then passes the hull shading data to a domain tessellation unit 825, and a connectivity tessellation unit 830 and writes the same data out to a parameter buffer 860. The domain tessellation unit then generates domain points which are fed back into the shading unit which applies the position part of the domain shader and feeds the generated vertices to a cache unit 850. The connectivity tessellation unit 830 feeds primitive indices to the cache unit. The referenced vertices are then fed to a clipping and culling unit 855 where (non-visible) sub pixel, non sample, crossing and back facing primitives are culled and any required clipping applied. The resulting vertices are passed to a projection unit 815 which projects them into to screen space. The resulting screen space primitives are then passed to a tiling unit 865 and a per tile primitive list generated as described for phase 1 above which are written to a parameter buffer 860. This process is repeated for all primitives within the scene as in normal tile based rendering.

Rasterisation is performed tile by tile as with a normal tile based rendering device. Object lists are fetched by a tiled parameter fetch unit 835 which, for normal primitive types, supplies them tile by tile to the HSR unit as described for a normal tile based rendering device. When the tiled parameter fetch unit encounters a patch based primitive it loads the associated hull shader output data, as emitted in phase 1 of the tessellation process into the shading unit 805. The tiled parameter fetch unit then feeds the indices for the vertices from the tessellated domain that the domain shader must operate on to the domain tessellation unit 825. The domain tessellation unit generates u,v values within the tessellated domain corresponding to the supplied indices and passes them to a shading unit 805 which applies the position part of the domain shader as described for phase 2 of the tessellation process. The generated position values are then passed to a cache unit 850. Domain shaded vertex positions are read from the cache 850 by the culling and clipping unit which passes unclipped/un-culled primitives to the projection unit 870 which projects the vertices into screen space. The resulting screen space primitives are then passed back to a hidden surface removal unit 840 where hidden surface removal is performed as per normal tile based rendering. Any primitives that are visible after hidden surface removal are passed back to the tiled parameter fetch unit 835 which issues the indices for the remaining primitives to the domain tessellation unit 825. The resulting domain points are again passed to a shading unit 805 which now applies the full domain shader producing all required position and texture coordinate values. The produced values are passed down to the cache, clipping/culling and projection blocks before being passed back to the FPU 845. The FPU performs any iteration of attributes which are then passed onto the shading unit 805 where normal pixel shading is performed as per a normal tile based rendering device.

What is claimed is:

1. An apparatus for processing tessellated patches of surfaces in a tile-based computer-graphics rendering system, comprising:
   domain shading logic configured to perform domain shading to generate vertex position data for tessellated primitives making up a surface patch; and
   a tiling unit configured to derive a per-tile list of primitive indices for tessellated primitives making up the surface patch using the generated vertex position data;
   wherein the domain shading logic is configured to perform domain shading to generate vertex position data for the tessellated primitives indicated by the primitive indices in the per-tile list for each tile.

2. The apparatus for processing tessellated patches of surfaces in a tile-based computer-graphics rendering system as claimed in claim 1, wherein the domain shading logic is further configured to determine domain point tessellation data and connectivity tessellation data from the primitive data.

3. The apparatus for processing tessellated patches of surfaces in a tile-based computer-graphics rendering system as claimed in claim 1, wherein the tiling unit is further configured to remove any nonvisible tessellated data such that these are not included in the per tile lists of primitive indices.

4. The apparatus for processing tessellated patches of surfaces in a tile-based computer-graphics rendering system as claimed in claim 1, wherein the domain shading logic comprises a hull shader configured for providing output data to a screen space geometry buffer.

5. A method for processing tessellated patches of surfaces in a tile-based computer graphics rendering system, comprising:
   implementing a geometry processing phase comprising:
      performing domain shading to generate vertex position data for tessellated primitives making up a surface patch; and
      deriving a per-tile list of primitive indices for the tessellated primitives making up the patch using the generated vertex position data;
   implementing a rasterisation phase comprising:
      performing domain shading to generate vertex position data for the tessellated primitives indicated by the primitive indices in the per-tile list for each tile.

6. The method as claimed in claim 5, wherein the deriving step is performed in a tiling unit.

7. The method as claimed in claim 5, further comprising shading at a programmable shading unit the tessellated primitives which remain after hidden surface removal for each tile for display.

8. The method as claimed in claim 5, wherein only a position part of the domain shading is performed to generate the vertex position data.

9. The method as claimed in claim 5, further comprising performing hull shading for the surface patch to calculate tessellation factors for the surface patch.

10. The method as claimed in claim 9, wherein the domain shading is performed on domain points making up the surface patch calculated from the tessellation factors.

11. The method as claimed in claim 9, further comprising writing the calculated tessellation factors to a memory.

12. The method as claimed in claim 5, further comprising compressing the per-tile list of primitive indices for the tessellated primitives produced from the surface patch.

13. The method as claimed in claim 5, wherein only a position part of the domain shading is performed to generate the vertex position data for the tessellated primitives indicated by the primitive indices in the per-tile list for each tile.

14. The method as claimed in claim 5, wherein the domain shading is performed on domain points making up the surface patch calculated from fetched tessellation factors.

15. The method as claimed in claim 11, wherein the domain points are calculated from the fetched tessellation factors by performing domain tessellation.

16. The method as claimed in claim 5, wherein hidden surface removal is performed on the tessellated primitives in the surface patch for each tile to generate a per-tile list of visible tessellated primitives for each tile.

17. The method as claimed in claim 16, further comprising the step of shading the tessellated primitives which remain after hidden surface removal by performing full domain shading to generate vertex position and attribute data for the visible tessellated primitives for each tile.

18. The method as claimed in claim 17, wherein the full domain shading is performed on domain points calculated for visible primitives for each tile from fetched tessellation factors.

19. The method as claimed in claim 18, wherein the domain points are calculated from the fetched tessellation factors by performing domain tessellation.

20. A non-transitory computer readable storage medium having stored thereon computer readable instructions that, when executed at a computer system, cause the computer system to perform a method of processing tessellated patches of surfaces in a tile based computer graphics rendering system, comprising:
   implementing a geometry processing phase comprising:
      performing domain shading to generate vertex position data for tessellated primitives making up a surface patch; and
      deriving a per-tile list of primitive indices for the tessellated primitives making up the patch using the generated vertex position data;
   implementing a rasterisation phase comprising:
      performing domain shading to generate vertex position data for the tessellated primitives indicated by the primitive indices in the per-tile list for each tile.

* * * * *